United States Patent
Tsunoda et al.

(10) Patent No.: US 12,287,160 B2
(45) Date of Patent: Apr. 29, 2025

(54) ALUMINUM FIN MATERIAL, HEAT EXCHANGER, AIR CONDITIONER, AND METHOD FOR PRODUCING ALUMINUM FIN MATERIAL

(71) Applicants: Kobe Steel, Ltd., Kobe (JP); Mitsubishi Electric Corporation, Chiyoda-ku (JP)

(72) Inventors: Ryosuke Tsunoda, Tochigi (JP); Keita Tateyama, Tochigi (JP); Reiji Morioka, Tokyo (JP); Etsuko Hirose, Tokyo (JP); Yoshinori Yamamoto, Tokyo (JP)

(73) Assignees: Kobe Steel, Ltd., Kobe (JP); Mitsubishi Electric Corporation, Chiyoda-ku (JP)

( * ) Notice: Subject to any disclaimer, the term of this patent is extended or adjusted under 35 U.S.C. 154(b) by 367 days.

(21) Appl. No.: 17/758,657

(22) PCT Filed: Jan. 25, 2021

(86) PCT No.: PCT/JP2021/002420
§ 371 (c)(1),
(2) Date: Jul. 12, 2022

(87) PCT Pub. No.: WO2021/153495
PCT Pub. Date: Aug. 5, 2021

(65) Prior Publication Data
US 2023/0046781 A1 Feb. 16, 2023

(30) Foreign Application Priority Data
Jan. 29, 2020 (JP) .................. 2020-012661

(51) Int. Cl.
*F28F 19/04* (2006.01)
*C09D 5/08* (2006.01)
(Continued)

(52) U.S. Cl.
CPC .............. *F28F 19/04* (2013.01); *C09D 5/08* (2013.01); *C09D 7/65* (2018.01); *C09D 133/04* (2013.01);
(Continued)

(58) Field of Classification Search
CPC ........ F28F 19/04; F28F 2245/00; C09D 5/08; C09D 7/65; C09D 133/04; C09D 171/02
(Continued)

(56) References Cited

U.S. PATENT DOCUMENTS

| | | | |
|---|---|---|---|
| 2010/0095697 A1* | 4/2010 | Morioka | C09D 5/1625 524/401 |
| 2015/0241146 A1* | 8/2015 | Yoshida | C09D 7/61 427/407.1 |
| 2019/0091976 A1 | 3/2019 | Roehrig et al. | |

FOREIGN PATENT DOCUMENTS

| | | | |
|---|---|---|---|
| JP | 2005-131647 A | | 5/2005 |
| JP | 2011184606 A | * | 9/2011 |

(Continued)

OTHER PUBLICATIONS

International Search Report and Written Opinion issued Mar. 2, 2021 in PCT/JP2021/002420 filed Jan. 25, 2021, 5 pages.

*Primary Examiner* — Steve S Tanenbaum
(74) *Attorney, Agent, or Firm* — Oblon, McClelland, Maier & Neustadt, L.L.P.

(57) ABSTRACT

An aluminum fin material includes an aluminum plate, an erosion-resistant coating layer on a surface of the aluminum plate, and a hydrophilic coating layer formed on a surface of the erosion-resistant coating layer. The erosion-resistant coating layer contains an acrylic resin and fluororesin particles, an amount of the erosion-resistant coating layer is 0.05 mg/dm$^2$ or more and 8.00 mg/dm$^2$ or less, and a content of the fluororesin particles in the erosion-resistant coating layer is 0.05 mass % or more and 8.00 mass % or less.

13 Claims, 3 Drawing Sheets

(51) Int. Cl.
*C09D 7/65* (2018.01)
*C09D 133/04* (2006.01)
*C09D 171/02* (2006.01)
*F28F 1/32* (2006.01)

(52) U.S. Cl.
CPC ............ *C09D 171/02* (2013.01); *F28F 1/325* (2013.01); *F28F 2245/02* (2013.01)

(58) Field of Classification Search
USPC ........................................................ 165/133
See application file for complete search history.

(56) References Cited

FOREIGN PATENT DOCUMENTS

| | | | | |
|---|---|---|---|---|
| JP | 2012024713 A | * | 2/2012 | |
| JP | 2013-210144 A | | 10/2013 | |
| JP | 2014-52184 A | | 3/2014 | |
| JP | 2014205332 A | * | 10/2014 | |
| JP | 2015-190744 A | | 11/2015 | |
| JP | 2016-90105 A | | 5/2016 | |
| JP | 2016089147 A | * | 5/2016 | |
| JP | 2019100675 A | * | 6/2019 | |
| JP | 2019113251 A | * | 7/2019 | |
| JP | 2019-174088 A | | 10/2019 | |
| WO | WO-2018110644 A1 | * | 6/2018 | ............... C08K 3/00 |

* cited by examiner

ALUMINUM FIN MATERIAL, HEAT EXCHANGER, AIR CONDITIONER, AND METHOD FOR PRODUCING ALUMINUM FIN MATERIAL

CROSS-REFERENCE TO RELATED APPLICATIONS

The present application is a 35 U.S.C. § 371 national stage application of International patent application PCT/JP2021/002420, filed Jan. 25, 2021, which is based on and claims the benefit of priority to Japanese Application 2020-012661, filed Jan. 29, 2020. The entire contents of these applications are incorporated herein by reference.

TECHNICAL FIELD

The present invention relates to an aluminum fin material, a heat exchanger, an air conditioner, and a method for producing an aluminum fin material.

BACKGROUND ART

Heat exchangers are used in products in various fields such as room air conditioners, package air conditioners, freezing showcases, refrigerators, oil coolers, and radiators.

An aluminum fin material used as fins of these heat exchangers has a hydrophilic film formed on a surface of the aluminum fin material from the viewpoints of reducing ventilation resistance and preventing water splash.

However, when the heat exchanger is driven for many years, dust floating in the atmosphere adheres to the surface of the hydrophilic film of the aluminum fin material. As a result, various problems may occur, such as increased ventilation resistance, mildew starting from the adhering dust, and reduced comfort when heat exchangers are installed in a living environment.

Therefore, regarding the aluminum fin material, the following techniques have been proposed from the viewpoint of preventing the adhesion of dust.

For example, Patent Literature 1 discloses an aluminum fin material in which fluororesin particles are contained in a baked coating film (hydrophilic film).

CITATION LIST

Patent Literature

Patent Literature 1: JP-A-2016-90105

SUMMARY OF INVENTION

Technical Problem

The technique according to Patent Literature 1 is a configuration in which fluororesin particles are contained in the baked coating film (hydrophilic film). However, with such a configuration, the hydrophobicity of the fluororesin particles reduces the hydrophilicity of the hydrophilic film, and it is difficult to ensure a high level of hydrophilicity.

The present invention has been made in view of the above problems, and an object thereof is to provide an aluminum fin material, a heat exchanger, an air conditioner, and a method for producing an aluminum fin material, which exert excellent hydrophilicity and antifouling property.

Solution to Problem

An aluminum fin material according to the present invention includes: an aluminum plate; an erosion-resistant coating layer formed on a surface of the aluminum plate; and a hydrophilic coating layer formed on a surface of the corrosion-resistant coating layer, in which the erosion-resistant coating layer contains an acrylic resin and fluororesin particles, an amount of the erosion-resistant coating layer is 0.05 mg/dm$^2$ or more and 8.00 mg/dm$^2$ or less, and a content of the fluororesin particles in the erosion-resistant coating layer is 0.05 mass % or more and 8.00 mass % or less.

In addition, a heat exchanger according to the present invention includes a fin made of the aluminum fin material according to the present invention.

Further, an air conditioner according to the present invention includes the heat exchanger according to the present invention.

Furthermore, a method for producing an aluminum fin material according to the present invention includes: a step of forming an erosion-resistant coating layer on a surface of an aluminum plate; and a step of forming a hydrophilic coating layer on a surface of the corrosion-resistant coating layer, in which the corrosion-resistant coating layer contains an acrylic resin and fluororesin particles, an amount of the corrosion-resistant coating layer is 0.05 mg/dm$^2$ or more and 8.00 mg/dm$^2$ or less, and a content of the fluororesin particles in the corrosion-resistant coating layer is 0.05 mass % or more and 8.00 mass % or less.

Advantageous Effects of Invention

The aluminum fin material, the heat exchanger, and the air conditioner according to the present invention can exert excellent hydrophilicity and antifouling property.

In addition, with the method for producing an aluminum fin material according to the present invention, it is possible to produce an aluminum fin material that can exert excellent hydrophilicity and antifouling property.

DESCRIPTION OF EMBODIMENTS

Hereinafter, the mode for carrying out an aluminum fin material (hereinafter referred to as a "fin material" as appropriate), a heat exchanger, an air conditioner, and a method for producing an aluminum fin material according to the present invention will be described in detail.

[Aluminum Fin Material]

Figure 1:
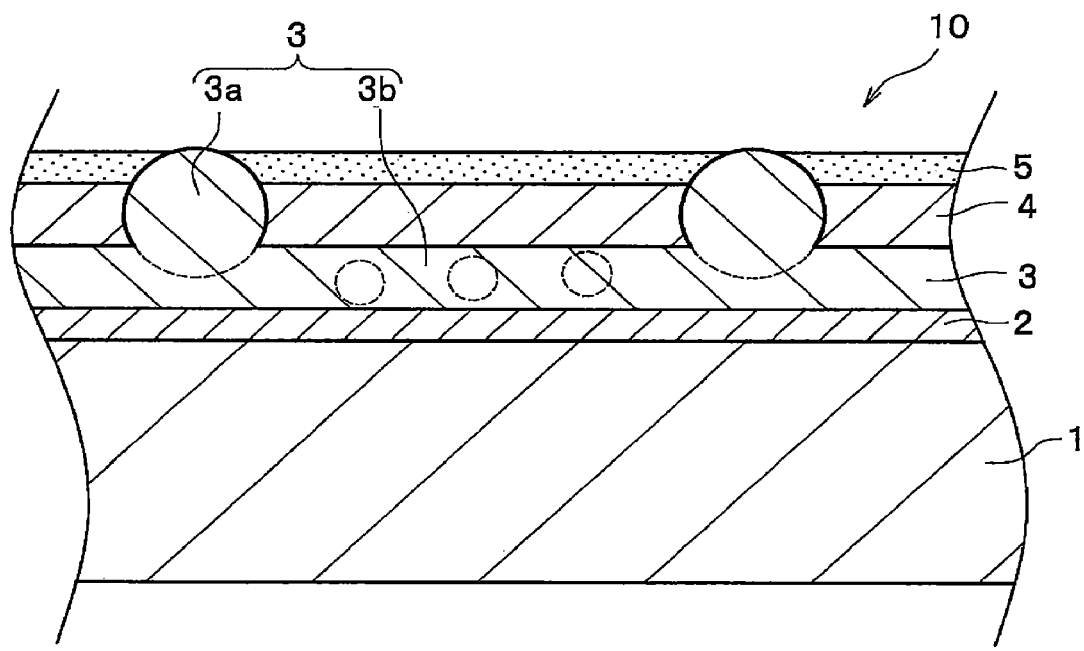
FIG. 1 is a schematic cross-sectional view of a fin material according to the present embodiment.

As shown in FIG. 1, a fin material 10 according to the present embodiment includes an aluminum plate 1, an erosion-resistant coating layer 3 formed on a surface of the aluminum plate 1, and a hydrophilic coating layer 4 formed on a surface of the corrosion-resistant coating layer 3. In addition, the fin material 10 according to the present embodiment may further include a lubricating coating layer 5 on a surface of the hydrophilic coating layer 4. Further, the fin material 10 according to the present embodiment may further include a base treatment layer 2 between the aluminum plate 1 and the corrosion-resistant coating layer 3.

Figure 2:
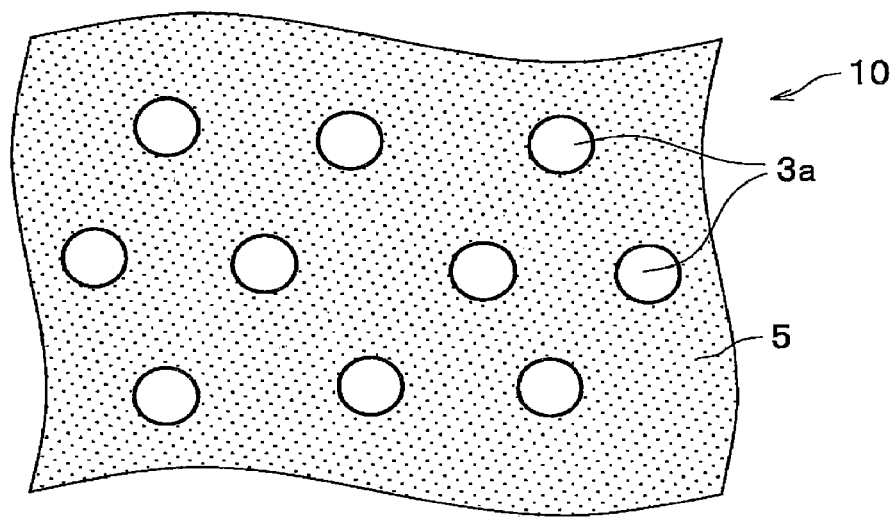
FIG. 2 is a schematic top view of the fin material according to the present embodiment.

The erosion-resistant coating layer 3 of the fin material 10 according to the present embodiment contains fluororesin particles 3a. As shown in FIG. 2, the fluororesin particles 3a are partially exposed from the surfaces of the hydrophilic coating layer 4 and the lubricating coating layer 5. That is, as shown in FIG. 1, it is presumed that the erosion-resistant coating layer 3 is composed of an undulating layer containing the fluororesin particles 3a and an acrylic resin 3b. Then, it is considered that the hydrophilic coating layer 4 is formed on the erosion-resistant coating layer 3 such that a part of the fluororesin particles 3a are exposed. In other words, it is considered that the fluororesin particles 3a are present in the erosion-resistant coating layer 3 and penetrate the hydrophilic coating layer 4.

Each coating layer of the fin material 10 according to the present embodiment is usually formed on both sides of the aluminum plate 1, but some or all of the coating layers may be formed only on one side of the aluminum plate 1.

Hereinafter, each configuration will be described in detail.

[Aluminum Plate]

The aluminum plate is made of pure aluminum or an aluminum alloy. As the aluminum plate, 1000 series aluminum specified in JIS H 4000:2014 can be preferably used from the viewpoints of thermal conductivity and processability. More specifically, aluminum having alloy numbers 1050, 1070, and 1200 is preferably used as the aluminum plate.

However, 2000 series to 9000 series aluminum alloys may be appropriately used as the aluminum plate.

The thickness of the aluminum plate may be appropriately determined according to the use and specifications of the fin material. Specifically, the thickness of the aluminum plate is preferably 0.08 mm or more and 0.3 mm or less from the viewpoints of appropriately ensuring processability to fins, strength of fins, thermal conductivity, and the like. When the thickness of the aluminum plate is 0.08 mm or more, it is possible to ensure the strength required for a general fin material. On the other hand, when the thickness of the aluminum plate is 0.3 mm or less, it is possible to ensure the processability to fins.

[Erosion-Resistant Coating Layer]

The erosion-resistant coating layer is a layer that plays a role of preventing water (such as dew condensation water), oxygen, chloride ions, and other ionic species from entering the aluminum plate side, and reducing corrosion of the aluminum plate and formation of aluminum oxide that generates an odor.

The erosion-resistant coating layer contains an acrylic resin and fluororesin particles.

(Erosion-Resistant Coating Layer: Acrylic Resin)

The acrylic resin contained in the erosion-resistant coating layer is obtained by polymerizing acrylic acid, methacrylic acid, or a derivative thereof.

The erosion-resistant coating layer is mainly composed of an acrylic resin except for the fluororesin particles described later. The content of the acrylic resin in the erosion-resistant coating layer is, for example, preferably 80 mass % or more, and more preferably 90 mass % or more.

(Erosion-Resistant Coating Layer: Fluororesin Particles)

The fluororesin particle contained in the erosion-resistant coating layer is a mass of fluororesin, and the fluororesin is a synthetic resin obtained by polymerizing an olefin hydrocarbon containing fluorine.

The content of the fluororesin particles in the erosion-resistant coating layer is 0.05 mass % or more, and preferably 0.25 mass % or more, 0.30 mass % or more. When the content of the fluororesin particles is larger than or equal to a predetermined value, an excellent antifouling property can be exerted.

The content of the fluororesin particles in the erosion-resistant coating layer is 8.00 mass % or less, preferably 6.00 mass % or less, 4.00 mass % or less, 2.50 mass % or less, 1.50 mass % or less. When the content of the fluororesin particles is larger than a predetermined value, the hydrophobicity based on the fluororesin particles is improved too much, and the hydrophilicity is lowered.

The average particle diameter (particle diameter refers to equivalent circle diameter) of the fluororesin particles is not particularly limited, and is preferably 0.1 µm or more and 5 µm or less, and more preferably 0.5 µm or more and 3 µm or less.

The particle diameter of the fluororesin particles can be measured by a scanning electron microscope (SEM) or an electron probe microanalyzer (EPMA).

(Erosion-Resistant Coating Layer: Amount)

The amount of the erosion-resistant coating layer is 0.05 mg/dm$^2$ or more, and preferably 0.08 mg/dm$^2$ or more, 0.10 mg/dm$^2$ or more. When the amount of the erosion-resistant coating layer is larger than or equal to a predetermined value, an excellent antifouling property can be exerted.

The amount of the erosion-resistant coating layer is 8.00 mg/dm$^2$ or less, and preferably 6.00 mg/dm$^2$ or less, 5.00 mg/dm$^2$ or less. When the amount of the erosion-resistant coating layer is larger than a predetermined value, the hydrophilicity is lowered, and it is impossible to ensure a high level of hydrophilicity.

Since most of the erosion-resistant coating layer is composed of the acrylic resin and the fluororesin particles described above, the amount of the erosion-resistant coating layer can be rephrased as formation amounts of the acrylic resin and the fluororesin particles.

The amount of the erosion-resistant coating layer can be adjusted by selecting the concentration of a coating composition for forming the erosion-resistant coating layer, or the bar coater No. for film formation. In addition, the amount of the erosion-resistant coating layer can be measured by fluorescent X-ray, infrared film thickness meter, weight measurement by peeling the coating, or the like.

The method for adjusting the amount of the hydrophilic coating layer described later, the method for adjusting the amount of the lubricating coating layer described later, the method for measuring the amount of the hydrophilic coating layer and the method for measuring the amount of the lubricating coating layer are the same as those for the erosion-resistant coating layer described above.

[Hydrophilic Coating Layer]

The hydrophilic coating layer is a layer for enhancing the hydrophilicity of the fin material. When the hydrophilic coating layer is provided, the contact angle of the dew condensation water adhering to the surface of the fin material becomes small, and the heat exchange efficiency of the heat exchanger is less likely to deteriorate. In addition, when the hydrophilicity is increased, the fluidity of the dew condensation water adhering to the surface of the fin material is also enhanced. Therefore, even when a pollutant adheres to the surface of the fin material, the pollutant can be easily washed off by the dew condensation water, and the removability for the pollutant is improved.

The hydrophilic coating layer preferably contains an acrylic resin.

(Hydrophilic Coating Layer: Acrylic Resin)

Similar to the acrylic resin of the erosion-resistant coating layer, the acrylic resin contained in the hydrophilic coating layer is obtained by polymerizing acrylic acid, methacrylic acid, and a derivative thereof.

The hydrophilic coating layer is mainly composed of an acrylic resin. The content of the acrylic resin in the hydrophilic coating layer is, for example, preferably 80 mass % or more, and more preferably 90 mass % or more.

(Hydrophilic Coating Layer: Amount)

The amount of the hydrophilic coating layer is 0.5 mg/dm$^2$ or more, and preferably 1 mg/dm$^2$ or more, 2 mg/dm$^2$ or more, 3 mg/dm$^2$ or more. When the amount of the hydrophilic coating layer is larger than or equal to a predetermined value, good hydrophilicity can be ensured.

The amount of the hydrophilic coating layer is 10 mg/dm$^2$ or less, and preferably 8 mg/dm$^2$ or less, 6 mg/dm$^2$ or less. When the amount of the hydrophilic coating layer is smaller than or equal to a predetermined value, the film formability is good, defects such as cracks are reduced, and the heat transfer resistance is reduced to a low level, so that the heat exchange efficiency of the fins is not easily impaired.

Since most of the hydrophilic coating layer is composed of the acrylic resin described above, the amount of the hydrophilic coating layer can be rephrased as the amount (formation amount) of the acrylic resin.

[Lubricating Coating Layer]

The lubricating coating layer is a layer for enhancing the lubricity of the surface of the fin material. When the lubricating coating layer is provided, the coefficient of friction of the surface of the fin material is reduced, and the press formability when processing the fin material into the fin is improved.

The lubricating coating layer is made of, for example, a resin composition containing one or more selected from the group consisting of polyethylene glycol, carboxymethyl cellulose, and an alkali metal salt of carboxymethyl cellulose. However, the resin to be used in the lubricating coating layer is not limited to these. Examples of the alkali metal salt of carboxymethyl cellulose include a sodium salt, a potassium salt, and a calcium salt. These resins may be subjected to known modifications such as urethane modification and alkyl modification by copolymerization with other monomers. Among these, a mixed resin of polyethylene glycol and sodium carboxymethyl cellulose is preferred. The mass ratio of polyethylene glycol to sodium carboxymethyl cellulose is preferably in the range of 5:5 to 9:1. With a resin having such a composition, the film formability and the lubricity are further improved.

(Lubricating Coating Layer: Amount)

The amount of the lubricating coating layer is 0.1 mg/dm$^2$ or more, and preferably 0.3 mg/dm$^2$ or more, 0.5 mg/dm$^2$ or more, 0.8 mg/dm$^2$ or more. When the amount of the lubricating coating layer is larger than or equal to a predetermined value, good lubricity can be obtained.

The amount of the lubricating coating layer is 5 mg/dm$^2$ or less, and preferably 3 mg/dm$^2$ or less, 2 mg/dm$^2$ or less, 1.5 mg/dm$^2$ or less. When the amount of the lubricating coating layer is smaller than or equal to a predetermined value, the heat transfer resistance can be reduced.

[Base Treatment Layer]

The base treatment layer is composed of an inorganic oxide or an inorganic-organic composite compound. When the base treatment layer is provided on the aluminum plate, the erosion resistance of the aluminum plate is enhanced. In addition, the adhesion between the aluminum plate and the coating layer arranged on the outer side of the aluminum plate is improved.

The inorganic oxide is preferably an oxide containing chromium (Cr) or zirconium (Zr) as a main component. Specific examples of such an inorganic oxide include an oxide formed by performing a chromate phosphate treatment, a zirconium phosphate treatment, a chromium chromate treatment, a zinc phosphate treatment, a titanium phosphate treatment, or the like. However, the type of the inorganic oxide is not limited to those formed by the above treatments.

Examples of the inorganic-organic composite compound include a compound formed by performing a coating type chromate treatment or a coating type zirconium treatment. Specific examples of such an inorganic-organic composite compound include an acrylic-zirconium composite.

The adhesion amount of the base treatment layer (the adhesion amount in terms of the mass of metal elements such as Cr and Zr) is preferably 1 mg/m$^2$ or more, and more preferably 5 mg/m$^2$ or more. When the adhesion amount of the base treatment layer is larger than or equal to a predetermined value, good erosion resistance can be exerted. The adhesion amount of the base treatment layer is preferably 100 mg/m$^2$ or less, and more preferably 80 mg/m$^2$ or less.

The thickness of the base treatment layer may be an appropriate thickness depending on the use of the fin material, and is preferably 1 nm or more and 100 nm or less, for example.

The adhesion amount of the base treatment layer can be adjusted by adjusting the concentration of the chemical conversion treatment liquid used for forming the base treatment layer or the film-forming treatment time. In addition, the adhesion amount and the thickness of the base treatment layer can be measured by fluorescent X-ray, infrared film thickness meter, mass measurement by elution, or the like.

[Heat Exchanger]

A heat exchanger according to the present embodiment includes a fin made of the above fin material.

Figure 3:
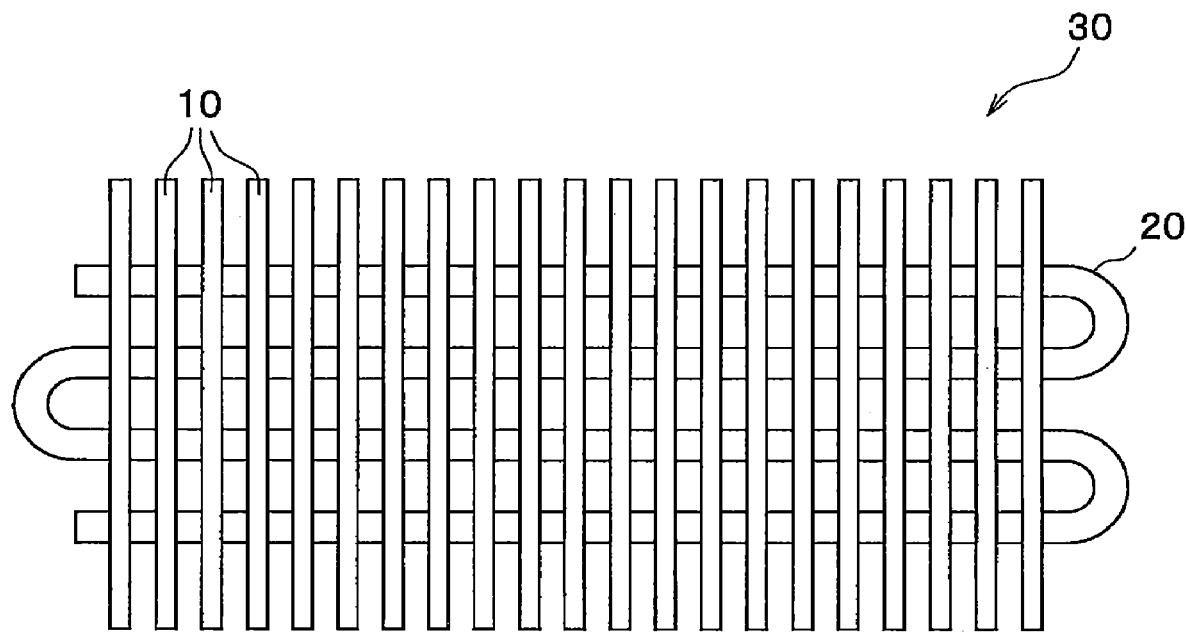
FIG. 3 is a schematic view of a heat exchanger according to the present embodiment.

As shown in FIG. 3, a configuration of a heat exchanger 30 according to the present embodiment may be any configuration of a known heat exchanger, and examples thereof include a configuration including a heat transfer tube 20 in addition to fins 10.

The heat exchanger according to the present embodiment can be applied to, for example, an air conditioner, a refrigerating showcase, a refrigerator, an oil cooler, a radiator, or the like, which will be described later.

[Air Conditioner]

An air conditioner according to the present embodiment includes the above heat exchanger.

Figure 4:
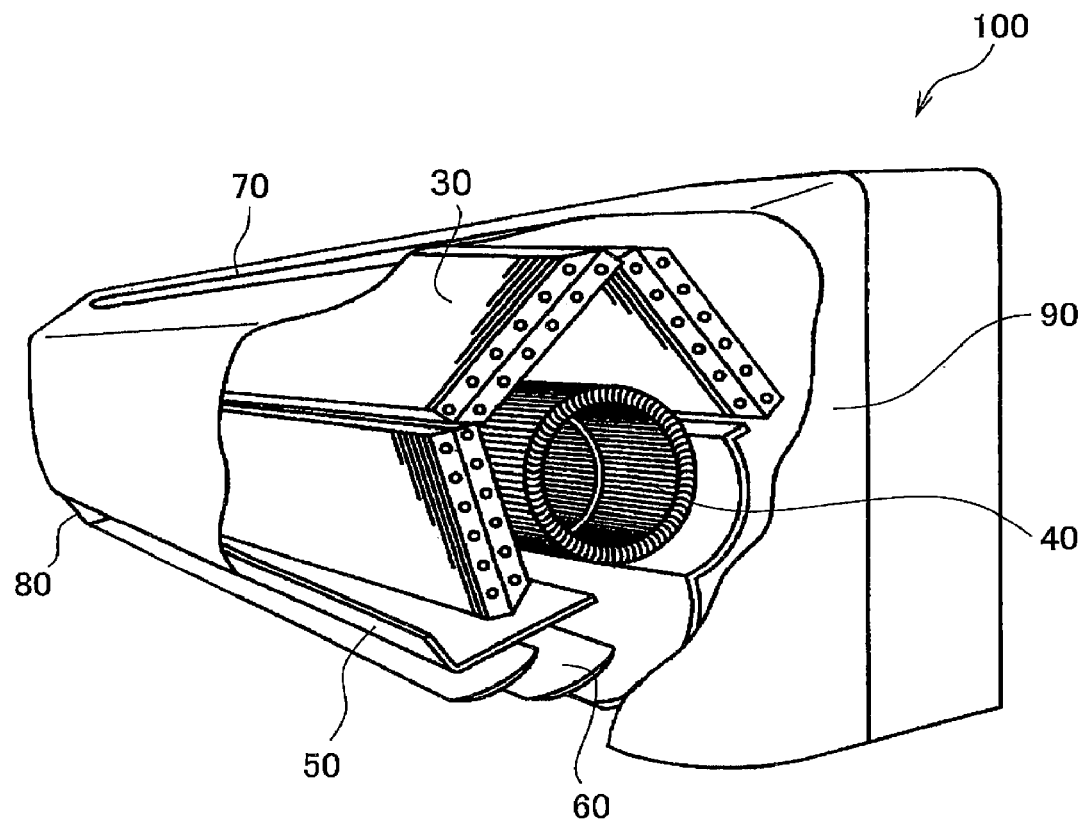
FIG. 4 is a schematic view of an air conditioner according to the present embodiment.

As shown in FIG. 4, a configuration of an air conditioner 100 according to the present embodiment may be any configuration of a known air conditioner, and examples thereof include a configuration including a cross flow fan 40, a drain pan 50, a louver 60, and a casing 90 provided with an inlet 70 and an outlet 80, in addition to the heat exchanger 30.

[Method for Producing Aluminum Fin Material]

Next, a method for producing an aluminum fin material according to the present embodiment will be described.

The method for producing an aluminum fin material according to the present embodiment includes a substrate production step and a coating layer forming step.

(Substrate Production Step)

In the substrate production step, an aluminum plate made of aluminum or an aluminum alloy is produced. For example, a metal is melted and the molten metal is solidified into an optional shape to obtain an ingot containing a predetermined amount of a chemical component such as Al. Then, the ingot is chamfered if necessary, and hot rolled or cold rolled to obtain an aluminum plate. When producing the aluminum plate, the ingot may be subjected to a homogenizing heat treatment, or may be subjected to intermediate annealing during the rolling. In addition, the rolled plate material may be subjected to a solution heat treatment, a tempering treatment, and the like.

(Coating Layer Forming Step)

In the coating layer forming step, a coating layer is formed on the surface of the aluminum plate. Specifically, the surface of the aluminum plate is cleaned and degreased as necessary, and then coating layers such as a base treatment layer, an erosion-resistant coating layer, a hydrophilic coating layer, and a lubricating coating layer are sequentially formed on the surface of the clean aluminum plate.

The base treatment layer can be formed by coating a chemical conversion treatment liquid onto the aluminum plate by spraying, or immersing the aluminum plate in a chemical conversion treatment liquid, and then heating and drying the obtained aluminum plate.

In addition, the erosion-resistant coating layer, the hydrophilic coating layer, and the lubricating coating layer can be formed by obtaining a coating composition by dispersing a resin or the like for the respective coating layer in a solvent, then performing coating with the respective coating composition by using a coating device such as a bar coater or a roll coater, and then performing baking. In order to produce the aluminum fin material having the above configuration, the coating composition for the erosion-resistant coating layer contains fluororesin particles. On the other hand, the coating composition for the hydrophilic coating layer does not contain fluororesin particles.

The coating baking temperature for each coating layer may usually be in the range of 100° C. or higher and 300° C. or lower. Since the fluororesin particles are blended in the coating composition for the erosion-resistant coating layer, the coating baking temperature at which the fluororesin particles do not decompose (for example, 100° C. or higher and 280° C. or lower) is preferred.

The coating composition for forming each coating used in the coating layer forming step is not limited to the above resins and fine particles. Various aqueous solvents and coating additives may be added in consideration of coatability, workability, physical characteristics of the coating film, etc. For example, various solvents and additives such as a water-soluble organic solvent, a cross-linking agent, a surfactant, a surface conditioner, a wet dispersant, a sedimentation inhibitor, an antioxidant, an antifoaming agent, a rust preventive, an antibacterial agent, and an antifungal agent may be blended alone or in combination.

With the above steps, the aluminum fin material according to the present embodiment can be produced.

Examples

Next, the aluminum fin material according to the present invention will be specifically described by comparing Example satisfying the requirements of the present invention with Comparative Example not satisfying the requirements of the present invention. The present invention is not limited to these Examples.

[Preparation of Test Material]

As the aluminum plate, an aluminum plate satisfying a standard of alloy number 1070 specified in JIS H 4000:2014 with a thickness of 0.1 mm was used. The surface of this aluminum plate was subjected to a chromate phosphate treatment to form a base treatment layer. The adhesion amount of the base treatment layer was 30 mg/m$^2$.

Then, an erosion-resistant coating layer, a hydrophilic coating layer, and a lubricating coating layer were formed on the surface of the base treatment layer in this order.

The erosion-resistant coating layer was formed by coating the surface of the base treatment layer with a coating composition by using a bar coater so as to have the amount shown in the table, followed by baking at 250° C. or lower.

As the coating compositions of test materials Nos. 2 and 5 to 15, a mixture of an acrylic resin and fluororesin particles (average particle diameter: about 0.1 μm to 1.0 μm) in a solvent was used such that the content after layer formation was the value shown in the table. On the other hand, the coating compositions of test materials Nos. 1, 3, and 4 are different from the coating compositions of the test materials Nos. 2 and 5 to 15 only in that they did not contain fluororesin particles.

The hydrophilic coating layer was formed by coating the surface of the erosion-resistant coating layer with a coating composition by using a bar coater so as to have the amount shown in the table, followed by baking at 250° C.

As the coating compositions of the test materials Nos. 1, 2, and 4 to 15, a mixture of an acrylic resin with a solvent was used. On the other hand, the coating composition of test materials No. 3 is different from the coating compositions of the test materials Nos. 1, 2, and 4 to 15 only in that fluororesin particles (average particle diameter: about 0.1 μm to 1.0 μm) were contained such that the content after layer formation was the value shown in the table.

The lubricating coating layer was formed by coating the surface of the hydrophilic coating layer with a coating composition by using a bar coater so as to have the amount shown in the table, followed by baking at 250° C.

As the coating compositions of the test materials Nos. 1 to 3 and 5 to 15, a mixture of a resin containing polyethylene glycol with a solvent was used. On the other hand, the coating composition of test materials No. 4 is different from the coating compositions of the test materials Nos. 1 to 3 and 5 to 15 only in that fluororesin particles were contained such that the content after layer formation was the value shown in the table.

Next, the prepared test materials were evaluated as follows.

[Hydrophilicity Evaluation]

The prepared test material was immersed in a water tank overflowing with tap water at a flow rate of 0.1 L/min for 8 hours. Then, an operation of drying at 80° C. for 16 hours was regarded as one cycle, and this cycle was repeated for a total of 14 cycles. Then, the test material was returned to room temperature and was then placed horizontally such that the evaluation surface faced upward, approximately 0.5 μL of pure water was dropped on the evaluation surface, and the contact angle was measured using a contact angle measuring device (CA-05 type manufactured by Kyowa Interface Science Co., Ltd.).

Figure 5:
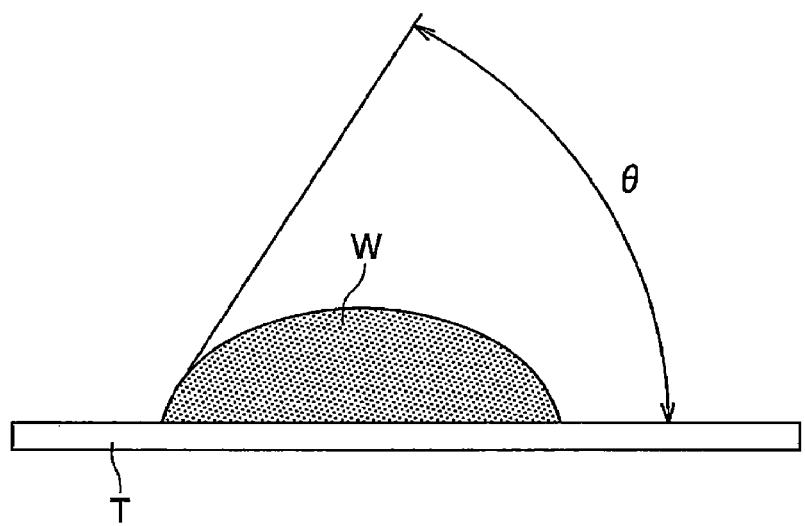
FIG. 5 is a schematic diagram illustrating a method of measuring a contact angle in hydrophilicity evaluation.

As shown in FIG. 5, a contact angle θ is an angle formed by a test material T and a water droplet W.

Then, the hydrophilicity was determined according to the following evaluation criteria.

(Hydrophilicity: Evaluation Criteria)

A: good: the contact angle is 40° or less.

B: generally good: the contact angle is more than 40° and less than 60°.

C: poor: the contact angle is 60° or more.

[Antifouling Property Evaluation]

11 types (Kanto Loam) and 12 types (carbon black) of test powders specified in JISZ 8901:2006 were adhered to the surface of the prepared test material.

After adhering each powder to the surface of the test material, an image of the surface of each test material was taken, and based on the obtained image, the evaluations of the adhesion amounts of Kanto Loam and carbon black were carried out in 5 stages (5 points: very large adhesion amount, 1 point: very small adhesion amount).

Then, regarding the antifouling property, those with a score of 3 or less for both carbon black and Kanto Loam were determined to be good, and those other than that were determined to be poor.

Table 1 shows the composition of the prepared test materials and the evaluation results.

The amount of each coating layer shown in Table 1 is a value measured by fluorescent X-rays. The content of the fluororesin particles shown in Table 1 is a value calculated based on the addition amounts of the acrylic resin and the fluororesin particles used in the coating composition for each coating layer. The particle diameter of the fluororesin particles used is a value measured by SEM.

layer. In addition, since the lubricating coating layer close to the surface layer contained a large amount of fluororesin particles, the result for the hydrophilicity was poor.

Since the test material No. 10 contained too much content of the fluororesin particles in the erosion-resistant coating layer, the result for the hydrophilicity was poor.

Since the test material No. 15 contained too much amount of the erosion-resistant coating layer, the result for the hydrophilicity was poor.

When both the erosion-resistant coating layer and the hydrophilic coating layer contain a large amount of fluororesin particles, considering the results of the test material No. 3, it is considered that the hydrophilicity is poor due to the influence of the fluororesin particles present in the hydrophilic coating layer near the surface layer. However, when the amount of fluororesin particles contained in the hydrophilic coating layer is very small, it is considered that the hydrophilicity does not significantly decrease.

Although various embodiments have been described above with reference to the drawings, it is needless to say that the present invention is not limited to these examples. It will be apparent to those skilled in the art that various changes and modifications may be conceived within the

TABLE 1

| | Erosion-resistant coating layer | | | Hydrophilic coating layer | | | Lubricating coating layer | | | Evaluation item | | |
|---|---|---|---|---|---|---|---|---|---|---|---|---|
| | Fluororesin particles | | | Fluororesin particles | | | Fluororesin particles | | | | Antifouling property | |
| No. | Presence or absence | Content (wt %) | Amount (mg/dm$^2$) | Presence or absence | Content (wt %) | Amount (mg/dm$^2$) | Presence or absence | Content (wt %) | Amount (mg/dm$^2$) | Hydrophilicity | Carbon black | Kanto Loam |
| 1 | No | — | 1.00 | No | — | 4 | No | — | 1 | A | 4 | 5 |
| 2 | Yes | 0.35 | 1.00 | No | — | 4 | No | — | 1 | A | 2 | 2 |
| 3 | No | — | 1.00 | Yes | 0.35 | 4 | No | — | 1 | C | 1 | 2 |
| 4 | No | — | 1.00 | No | — | 4 | Yes | 0.35 | 1 | C | 1 | 1 |
| 5 | Yes | 0.10 | 1.00 | No | — | 4 | No | — | 1 | A | 2 | 2 |
| 6 | Yes | 0.50 | 1.00 | No | — | 4 | No | — | 1 | A | 2 | 2 |
| 7 | Yes | 1.00 | 1.00 | No | — | 4 | No | — | 1 | A | 2 | 2 |
| 8 | Yes | 2.00 | 1.00 | No | — | 4 | No | — | 1 | B | 1 | 1 |
| 9 | Yes | 5.00 | 1.00 | No | — | 4 | No | — | 1 | B | 1 | 1 |
| 10 | Yes | 10.00 | 1.00 | No | — | 4 | No | — | 1 | C | 1 | 1 |
| 11 | Yes | 0.35 | 0.10 | No | — | 4 | No | — | 1 | A | 2 | 2 |
| 12 | Yes | 0.35 | 0.50 | No | — | 4 | No | — | 1 | A | 2 | 2 |
| 13 | Yes | 0.35 | 2.00 | No | — | 4 | No | — | 1 | A | 2 | 2 |
| 14 | Yes | 0.35 | 5.00 | No | — | 4 | No | — | 1 | A | 1 | 1 |
| 15 | Yes | 0.35 | 10.00 | No | — | 4 | No | — | 1 | C | 1 | 1 |

The test materials Nos. 2, 5 to 9, and 11 to 14 satisfied the requirements specified in the present invention. Therefore, the test materials Nos. 2, 5 to 9, and 11 to 14 had preferred results in both "hydrophilicity" and "antifouling property".

On the other hand, since the test materials Nos. 1, 3, 4, 10, and 15 did not satisfy the requirements specified in the present invention, unfavorable results were obtained for at least one of hydrophilicity and antifouling property.

Since the test material No. 1 did not contain fluororesin particles in the erosion-resistant coating layer, the result for the antifouling property was poor.

The test material No. 3 contained 0.35 mass % of fluororesin particles in the hydrophilic coating layer and did not contain fluororesin particles in the erosion-resistant coating layer. In addition, since the hydrophilic coating layer close to the surface layer contained a large amount of fluororesin particles, the antifouling property was good, but the hydrophilicity was poor.

The test material No. 4 contained 0.35 mass % of fluororesin particles in the lubricating coating layer and did not contain fluororesin particles in the erosion-resistant coating scope of the claims, it is also understood that the various changes and modifications belong to the technical scope of the present invention. Components in the embodiments described above may be combined arbitrarily within a range not departing from the spirit of the present invention.

The present application is based on a Japanese patent application (No. 2020-012661) filed on Jan. 29, 2020, contents of which are incorporated herein by reference.

REFERENCE SIGNS LIST 1 aluminum plate
2 base treatment layer
3 erosion-resistant coating layer
3a fluororesin particles
4 hydrophilic coating layer
5 lubricating coating layer
10 fin material
30 heat exchanger
100 air conditioner

The invention claimed is:

1. An aluminum fin material, comprising:
   an aluminum plate;
   a base treatment layer comprising at least one selected from the group consisting of an inorganic oxide and an inorganic-organic composite compound, the base treatment layer disposed on and in contact with a surface of the aluminum plate;
   an erosion-resistant coating layer disposed on and in contact with a surface of the base treatment layer; and
   a hydrophilic coating layer formed on and in contact with a surface of the erosion-resistant coating layer,
   wherein:
   the erosion-resistant coating layer comprises an acrylic resin and fluororesin particles,
   an amount of the erosion-resistant coating layer is 0.05 mg/dm$^2$ or more and 8.00 mg/dm$^2$ or less, and
   a content of the fluororesin particles in the erosion-resistant coating layer is 0.05 mass % or more and 8.00 mass % or less.

2. The aluminum fin material according to claim 1, further comprising:
   a lubricating coating layer on a surface of the hydrophilic coating layer,
   wherein the lubricating coating layer is made of a resin composition including at least one selected from the group consisting of polyethylene glycol, carboxymethyl cellulose, and an alkali metal salt of carboxymethyl cellulose.

3. The aluminum fin material according to claim 2, further comprising a base treatment layer between the aluminum plate and the erosion-resistant coating layer.

4. The aluminum fin material according to claim 1, wherein
   the fluororesin particles have an average particle diameter of 0.5 to 3 μm,
   a portion of the fluororesin particles protrude beyond a surface of the erosion-resistant coating layer such that a volume of a protruding fluororesin particle is embedded in the hydrophilic coating layer, and
   the hydrophilic coating layer is devoid of fluororesin particles other than fluororesin particles protruding from beyond the surface of the erosion-resistant coating layer.

5. A heat exchanger comprising a fin comprising the aluminum fin material according to claim 1.

6. An air conditioner comprising the heat exchanger according to claim 5.

7. The aluminum fin material according to claim 1, wherein the hydrophilic coating layer comprises an acrylic resin.

8. The aluminum fin material according to claim 7, further comprising a base treatment layer between the aluminum plate and the erosion-resistant coating layer.

9. The aluminum fin material according to claim 7, further comprising:
   a lubricating coating layer on a surface of the hydrophilic coating layer, wherein the lubricating coating layer is made of a resin composition containing at least one selected from the group consisting of polyethylene glycol, carboxymethyl cellulose, and an alkali metal salt of carboxymethyl cellulose.

10. The aluminum fin material according to claim 9, further comprising a base treatment layer between the aluminum plate and the erosion-resistant coating layer.

11. A heat exchanger comprising a fin comprising the aluminum fin material according to claim 7.

12. An air conditioner comprising the heat exchanger according to claim 11.

13. A method for producing an aluminum fin material, the method comprising:
    forming a base treatment layer comprising at least one selected from the group consisting of an inorganic oxide and an inorganic-organic composite compound on a surface of an aluminum plate;
    forming an erosion-resistant coating layer on a surface of the base treatment layer; and
    forming a hydrophilic coating layer on a surface of the erosion-resistant coating layer,
    wherein:
    the erosion-resistant coating layer comprises an acrylic resin and fluororesin particles,
    the hydrophilic coating layer is substantially free of fluororesin particles,
    an amount of the erosion-resistant coating layer is 0.05 mg/dm$^2$ or more and 8.00 mg/dm$^2$ or less, and
    a content of the fluororesin particles in the erosion-resistant coating layer is 0.05 mass % or more and 8.00 mass % or less.

* * * * *